July 24, 1923.
H. A. MYERS
VALVE MECHANISM
Filed March 17, 1919
1,462,651
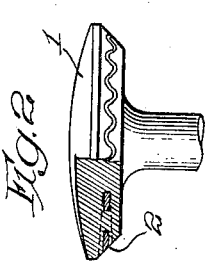
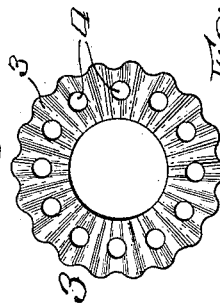
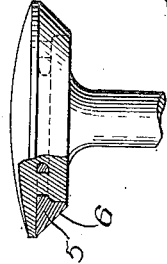
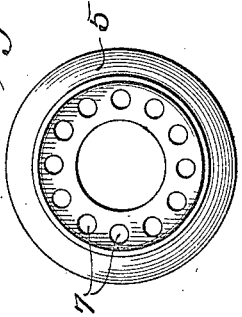
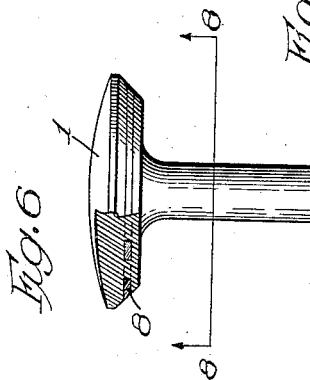
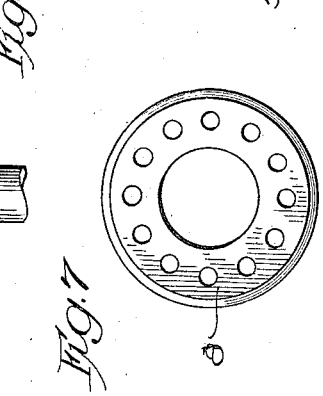
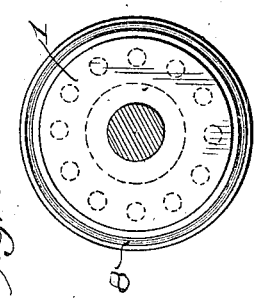
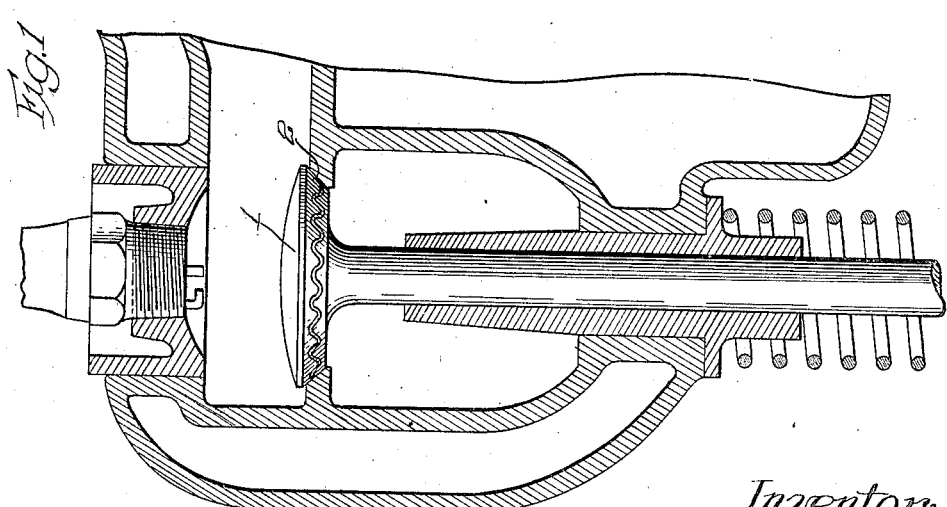
Inventor:
H. A. Myers
By Arthur F. Durand
Atty.

Patented July 24, 1923.

1,462,651

UNITED STATES PATENT OFFICE.

HUBERT A. MYERS, OF TOLEDO, OHIO, ASSIGNOR OF ONE-HALF TO HERMAN WIENER, OF TOLEDO, OHIO.

VALVE MECHANISM.

Application filed March 17, 1919. Serial No. 283,007.

*To all whom it may concern:*

Be it known that I, HUBERT A. MYERS, a citizen of the United States of America, and a resident of Toledo, Ohio, have invented a certain new and useful Improvement in Valve Mechanism, of which the following is a specification.

This invention relates to valves, but more particularly to those employed in internal combustion engines. Such valves, of course, are required to withstand high temperature, and various difficulties have been encountered. Some metals, such as cast iron, will not warp, but become rough or pitted, and thus interfere with the effectiveness of the valve; and on the other hand, some metals, while hard enough or of a quality to remain smooth, warp and thereby prevent the proper seating of the valve.

Generally stated, therefore, the object of the invention is to provide an improved construction and arrangement which will combine the advantages of different kinds of metal in a manner to not only prevent warping of the valve, but also to insure against such a roughening or pitting of the valve as would interfere with the proper action thereof, so that the valve will withstand high temperature and continued use without becoming injured or defective, thereby insuring against leakage.

To these and other useful ends the invention consists in matters hereinafter set forth and claimed, and shown in the accompanying drawings, in which—

Fig. 1 is a section of a portion of an internal combustion engine having a valve embodying the principles of the invention.

Fig. 2 is a side elevation of the valve head, showing a portion thereof in section.

Fig. 3 is a plan of the corrugated washer which is incorporated in said valve head.

Fig. 4 is a view similar to Fig. 2, but showing a different form of the invention.

Fig. 5 is a bottom plan of the beveled washer which is incorporated in the valve head shown in Fig. 4.

Fig. 6 is a view similar to Fig. 2, but showing a different form of the invention.

Fig. 7 is a plan of the perforated and flat washer which is incorporated in the valve head shown in Fig. 6.

Fig. 8 is a section on line 8—8 in Fig. 6.

As thus illustrated, and referring to Figs. 1, 2, and 3, it will be seen that the valve head comprises a body 1, which is preferably of cast iron, and which is beveled at its edges to engage the beveled and circular valve seat 2 of the valve mechanism. A corrugated washer 3 is solidly embedded in the valve head, being cast therein, and is preferably provided with openings 4 for the cast metal to enter, so that the washer will be firmly anchored in the cast iron valve head. The corrugations of the washer, it will be seen, serve in effect to widen the bearing of the washer on the valve seat 2, so that practically a wide bearing is obtained with thin metal. Said washer 3 can be made of any suitable metal which will resist high temperatures, and which will not burn out or deteriorate, such for example, as nichrome, or any other similar metal. The cast iron body 1 of the valve head will not warp, but such cast metal is subject to pitting or roughening by the action of the carbon which forms within the engine, it being understood that this is the exhaust valve of the engine. However, the washer 3 will remain true and perfect around its edge, as it will not deteriorate under the action of the products of combustion and the high temperature, so that the valve will always seat properly, thereby preventing leakage.

In Figs. 4 and 5, the construction is similar, but in this case a heavy washer 5 having a wide beveled edge surface 6 is incorporated in the valve head, being provided with openings 7 like those previously described. In this way, only the metal of the washer or ring 5 engages the valve seat. In this case the ring 5 may also be made of any suitable heat-resisting metal.

In Figs. 6, 7 and 8, the construction is similar to that shown in Figs 1, 2 and 3, except that the washer 8 is perfectly flat and not corrugated. This will provide an edge which will always engage the valve seat and which will not become roughened or pitted under the action of the products of combustion, but which does not involve the wide bearing which characterizes the washer 3 previously described—that is to say, it does not have as wide a bearing on the valve seat as does the corrugated washer.

From the foregoing it will be seen that the invention contemplates a valve having one kind of metal which will not warp, so that the shape of the valve head is retained, and another kind of metal which might warp, but which is held against warping by the cast iron or other metal body of the valve head, and which will not be injured by the heat and the products of combustion, so that as between the two metals a true edge is always insured for the valve head, whereby it will seat properly and prevent leakage.

While the body of the head 1 is of ordinary cast metal, and subject to deterioration, in the manner explained, it will be understood that the metal insert (such as the insert 2 or 5 or 8) is of relatively non-deteriorating metal, being able to resist high temperatures and other action which will cause roughening and pitting of the cast metal but which will not affect the heat resisting metal insert.

What I claim as my invention is:—

1. In an engine, a valve comprising a valve-seat, a cast metal valve-head which is molded upon and has therein a previously formed high temperature heat-resisting and relatively non-deteriorating metal insert permanently and rigidly embedded within the cast metal thereof and thus anchored against working out of position to engage the valve-seat, said insert having its outer edge formed to engage the valve-seat, and having its inner portion formed with anchoring means cast in the valve-head by molding the metal of the head thereon, so that the cast metal which is subject to deterioration is shrunk upon the previously formed insert, to prevent displacement of the insert in any direction.

2. A valve as specified in claim 1, said insert comprising a metal plate with a circular outer edge, said valve seat being circular to engage said circular edge, and said anchoring means having openings therein through which the cast metal of the head extends to solidly retain the insert in the head.

3. A valve as specified in claim 1, said insert comprising a ring having radial corrugations to in effect widen its bearing on the valve seat.

4. A valve as specified in claim 1, said insert having a beveled circular edge, and said valve seat being beveled to engage said edge.

5. The combination of a valve-seat, and a valve-head of metal, which is subject to deterioration having a heat-resisting and relatively non-deteriorating perforated metal insert permanent embedded therein to engage said valve-seat.

6. A valve comprising a valve-seat and a cast metal valve-head, which is subject to deterioration having a heat-resisting and relatively non-deteriorating metal insert rigidly embedded therein to engage the valve seat, said insert comprising a metal plate with a circular outer edge, said valve seat being circular to engage said circular edge, and said plate having openings therein through which the cast metal of the head extends to solidly anchor the insert in the head.

7. A valve comprising a valve-seat and a cast metal valve-head, which is subject to deterioration having a heat-resisting and relatively non-deteriorating metal insert rigidly embedded therein to engage the valve-seat. said insert comprising a ring having radial corrugations to in effect widen its bearing on the valve seat.

HUBERT A. MYERS.